United States Patent
Harrison

Patent Number: 5,930,356
Date of Patent: Jul. 27, 1999

[54] TELEPHONE HANDSET COVER

[76] Inventor: Mark R. Harrison, P.O. Box 58783, Raleigh, N.C. 27658

[21] Appl. No.: 08/871,867
[22] Filed: Jun. 9, 1997

Related U.S. Application Data

[60] Provisional application No. 60/021,055, Jul. 2, 1996.

[51] Int. Cl.$^6$ .................................................. H04M 1/00
[52] U.S. Cl. ........................................... 379/452; 379/439
[58] Field of Search .................................. 379/452, 439, 379/451, 437

[56] References Cited

U.S. PATENT DOCUMENTS

| | | |
|---|---|---|
| D. 214,322 | 6/1969 | Velasquez . |
| D. 291,306 | 8/1987 | Espinosa . |
| D. 300,629 | 4/1989 | Martens . |
| D. 302,016 | 7/1989 | Williams, Jr. . |
| 3,962,555 | 6/1976 | Efaw . |
| 4,736,418 | 4/1988 | Steadman . |
| 4,819,265 | 4/1989 | Colella . |
| 4,949,377 | 8/1990 | Nishina et al. . |
| 4,964,161 | 10/1990 | Trowbridge, Jr. . |
| 5,012,513 | 4/1991 | Dale et al. . |
| 5,054,063 | 10/1991 | Lo et al. . |

FOREIGN PATENT DOCUMENTS

| | | |
|---|---|---|
| 0484267 A1 | 5/1992 | European Pat. Off. . |
| 2692743 A1 | 12/1993 | France . |
| WO 89/06479 | 7/1989 | WIPO . |

Primary Examiner—Jack Chiang
Attorney, Agent, or Firm—Richard C. Litman

[57] ABSTRACT

A telephone handset cover configured to closely and substantially cover a telephone handset and having an opening extending the length of one side for insertion of the handset. The handset cover is used to protect individuals from germs or other hazards associated with the use of public telephones. The handset cover is made of molded plastic material and has apertures in the mouthpiece and earpiece to facilitate normal use of the telephone handset. The opening along the one side allows a user to insert the telephone handset into the cover while the handset hangs on a telephone hook, which provides full coverage of the mouthpiece and earpiece surfaces that lie in closest proximity to the head of the user and prevents contact with the handset.

10 Claims, 4 Drawing Sheets

TELEPHONE HANDSET COVER

CROSS-REFERENCE TO RELATED APPLICATION

This application claims the benefit of U.S. Provisional Patent Application Ser. No. 60/021,055, filed Jul. 2, 1996.

BACKGROUND OF THE INVENTION

1. Field of the Invention

The present invention relates to a telephone handset cover. More specifically, the invention is a semi-flexible telephone handset cover having an opening extending the length of one side which can be easily slid over the handset to protect individuals from germs or other hazards associated with the use of public telephones.

2. Description of Related Art

Public telephones are handled by a multitude of people each day. Consequently, there is a need for a device which can protect public telephone users from catching any diseases and germs that may be living on the telephone handset. It is generally accepted among the medical community that certain diseases and germs can be readily transferred from a surface such as a phone handset to a user of that phone who touches the phone and then rubs her eyes or mouth or who later eats food without washing her hands. One way to prevent such a transfer of diseases or germs is by preventing contact with the telephone handset. Each of the following patents fails to achieve the maximum level of protection from diseases and germs living on public telephone handsets.

U.S. Design Pat. No. 214,322, issued on Jun. 3, 1969, to Willie L. Velasquez describes ornamental features of a handset cover that wraps around the handset and has end sections for covering the mouthpiece and the earpiece.

U.S. Design Pat. No. 291,306, issued on Aug. 11, 1987, to Gil Espinosa, U.S. Pat. No. 5,054,063, issued on Oct. 1, 1991, to Josephine N. Lo et al., and PCT Patent Application Number WO 89/06479, published on Jul. 13, 1989, describe caps used for covering the mouthpiece and the earpiece of a telephone handset to prevent the spread of germs thereon.

U.S. Design Pat. No. 300,629, issued on Apr. 11, 1989, to Keith R. Martens, U.S. Design Pat. No. 302,016, issued on Jul. 4, 1989, to Alphonso F. Williams, Jr., and U.S. Pat. No. 4,736,418, issued on Apr. 5, 1988, to Diana M. Steadman describe telephone handset covers that have openings along the back of the handset which allow the handset to be placed inside of the cover. Similarly, U.S. Pat. No. 4,819,265, issued on Apr. 4, 1989, to James A. Colella describes a disposable telephone handset cover that has a top center slit in its back portion to allow a telephone handset to be inserted into the cover.

U.S. Pat. No. 3,962,555, issued on Jun. 8, 1976, to Dale E. Efaw teaches in one embodiment the use of a cover for a telephone handset whereby an opening behind the earpiece and mouthpiece caps, and along the back portion thereof allows a handset to be inserted into the cover.

U.S. Pat. No. 4,949,377, issued on Aug. 14, 1990, to Dorothy O. Nishina et al. describes a telephone handset sterilizing device which can be attached to a handset with adhesive to sterilize the handset.

U.S. Pat. No. 4,964,161, issued on Oct. 16, 1990, to Allen R. Trowbridge, Jr. describes a cover for a telephone handset which includes a sleeve that slides over the handset and disposable filter elements for the earpiece and the mouthpiece.

U.S. Pat. No. 5,012,513, issued on Apr. 30, 1991, to George L. Dale et al. describes a telephone handset cover which is generally permanently affixed to a public telephone to protect the handset from damage.

And finally, EPO Patent Application Number 0484267 (A1), published on May 6, 1992, and French Patent Application Number 2,692,743(A1), published on Dec. 24, 1993, describe disposable sleeves that can be slid over the handset to prevent the spread of germs.

All of the above described patents fail to adequately protect individuals from diseases and germs which are present on the handle of the handset. The devices currently available require the user to lift the handset up off of the hook in order to then place the handset within the cover. There is a high degree of risk that diseases and germs will be transferred to the user through the handling of the telephone handset when the user is placing the handset within the cover. Consequently, there is a need for a handset cover which can be quickly and easily slipped onto a handset without requiring the user to touch the handset and risk contamination from diseases or germs. The cover should also give the user the maximum amount of protection possible from diseases and germs by covering a substantial portion of the handset.

None of the above inventions and patents, taken either singularly or in combination, is seen to describe the instant invention as claimed. Thus a telephone handset cover solving the aforementioned problems is desired.

SUMMARY OF THE INVENTION

The present invention relates to a telephone handset cover. More specifically, the invention is a telephone handset cover having an opening extending the length of one side. The cover is used to protect individuals from germs or other hazards associated with the use of public telephones. The handset cover is made of molded plastic material and has apertures in the mouthpiece and earpiece to facilitate normal use of the telephone handset. The opening along the one side allows a user to insert the telephone handset into the cover, which provides full coverage of the mouthpiece and earpiece surfaces that lie in closest proximity to and/or contact the user.

Accordingly, it is a principal object of the invention to provide a device which can protect public telephone users from catching any diseases and germs that may be living on the telephone handset.

It is another object of the invention to provide a handset cover which does not require the user to pick up the handset and then place the handset within the cover, and which thereby reduces the risk that diseases and germs will be transferred to the telephone user.

It is a further object of the invention to provide a handset cover which gives the user the maximum amount of protection possible from diseases and germs by covering a substantial portion of the handset.

Still another object of the invention is to provide a reusable cover for telephone handsets.

It is an object of the invention to provide improved elements and arrangements thereof in a telephone handset cover for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
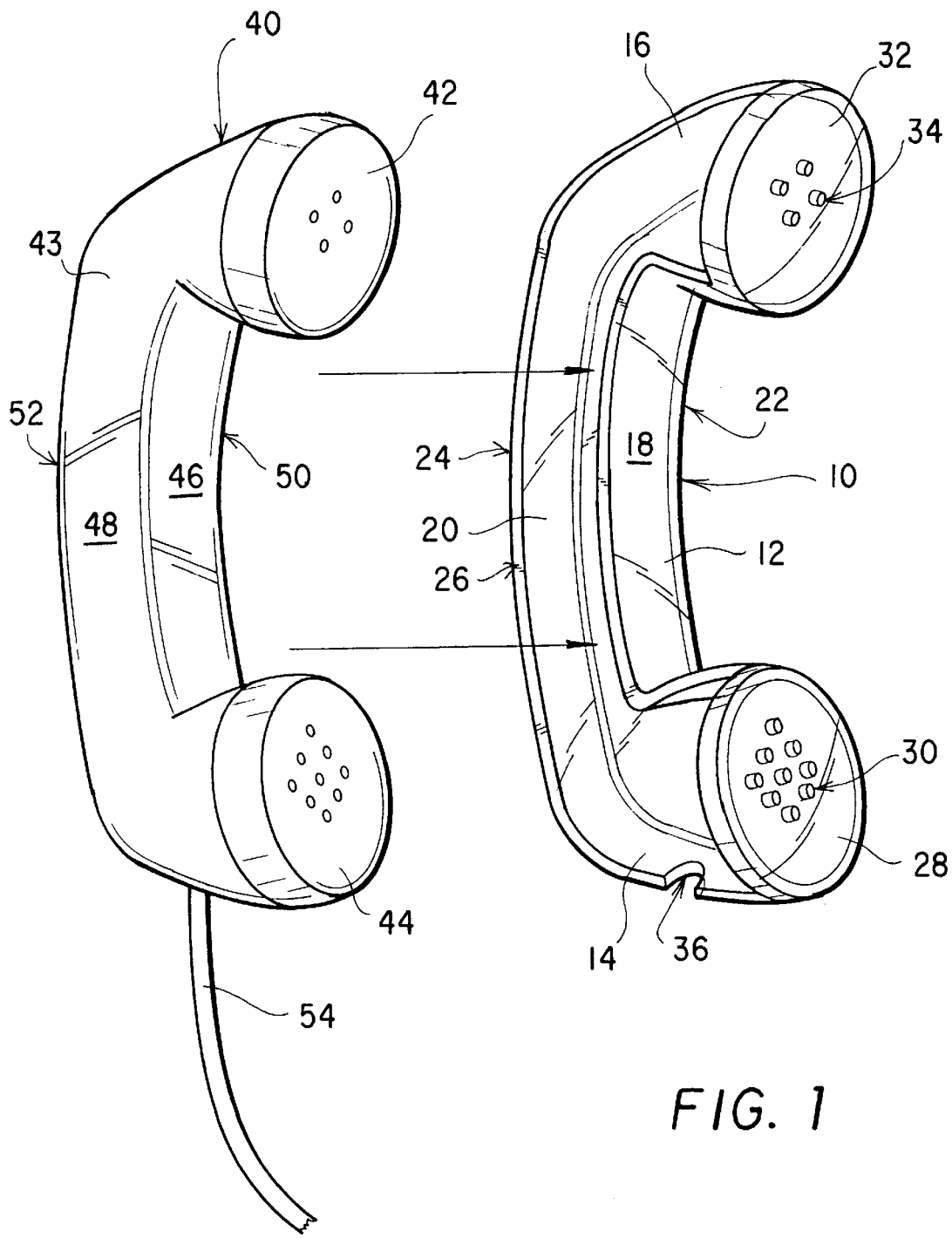
FIG. 1 is an elevational view of a telephone handset cover according to the present invention shown next to a telephone handset.

Referring to FIGS. 1 through 4, the present invention relates to a telephone handset cover 10 that is used to protect individuals from germs or other hazards associated with the use of public telephone handsets 40. The handset cover 10 is made of molded plastic material and has apertures, 30 and 34, in the mouthpiece 28 and earpiece 32, respectively, to facilitate normal use of the telephone handset 40. The opening 24 along the one side allows a user to insert the telephone handset 40 into the cover 10. The cover 10 provides full coverage of the mouthpiece 44 and earpiece 42 surfaces that lie in closest proximity to the head of the user.

FIG. 1 shows an environmental view of the telephone handset cover 10 and a public telephone handset 40. The telephone handset has a front side 46 with both an earpiece 42 and a mouthpiece 44 protruding therefrom, a back side 52 opposite the front side 46, and a pair of opposing lateral sides 48 and 50 that are generally perpendicular to the front and back sides. When a person uses the telephone handset 40 there is a high degree of risk that person will transfer any diseases or germs that they may be carrying to not only the mouthpiece 44 and the earpiece 42 of the handset but also the handle 43.

Figure 2:
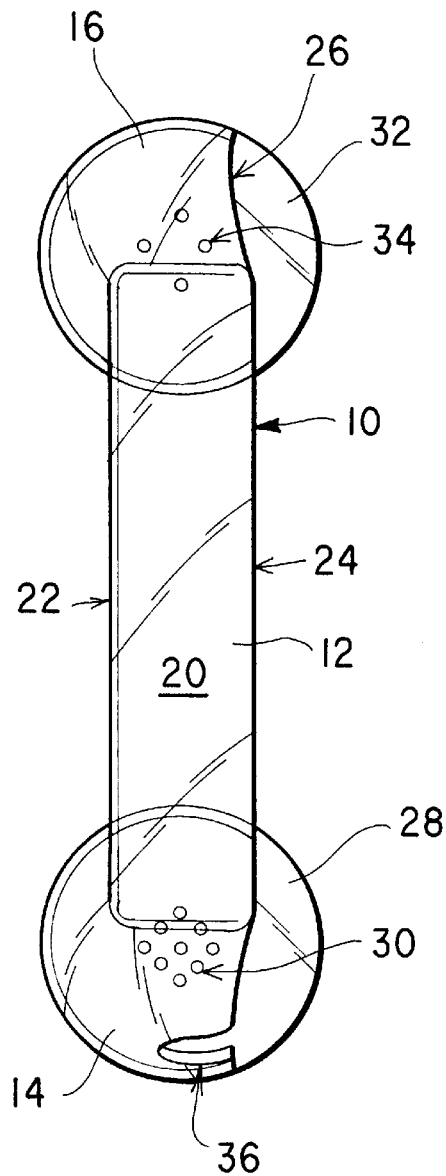
FIG. 2 is a back side view of a telephone handset cover according to the present invention.
Figure 3:
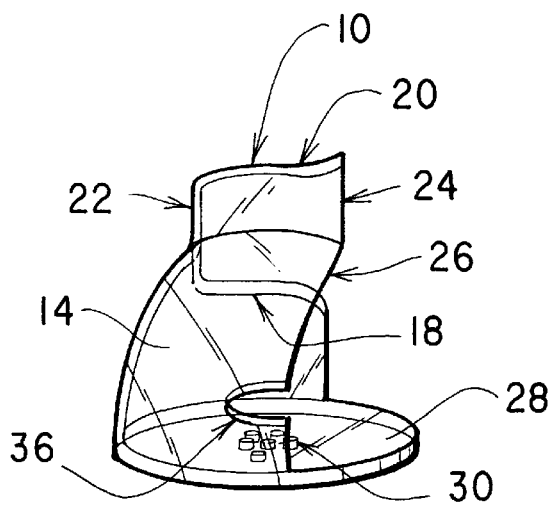
FIG. 3 is an end view of a telephone handset cover according to the present invention.

As shown in FIGS. 1 through 3, the handset cover of the present invention includes a handle section 12 and two end sections 14 (telephone transmitter cover) and 16 (telephone receiver cover) The cover 10 shields a substantial portion of the handset. The cover 10 includes a front side 18, a back side 20, a covered lateral side 22, a mouthpiece 28, and an earpiece 32. The handle section 12 of the cover has an opening 24 along one of the lateral sides of the handset which allows the cover to be slid over the handset without having to touch the handset. The end sections 16 and 14 cover the areas adjacent to the earpiece and the mouthpiece of the handset, respectively, and have apertures 34 and 30 adjacent to the earpiece and the mouthpiece of the handset, respectively, to facilitate normal use of the telephone. The cover 10 also has a notch 36 in the mouthpiece section 14 to prevent any interference between the cover 10 and the cord 54 of the telephone handset.

Figure 5:
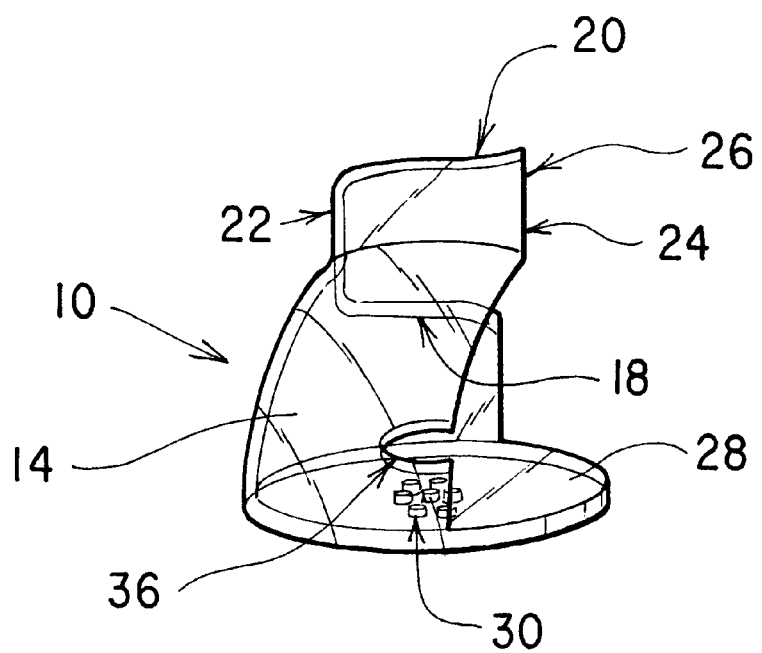
FIG. 5 is an end view of a telephone handset cover according to the present invention with the edges flared to allow the cover to easily slide on to the handset.

The opening 24 is essentially the same shape as the cross section of the telephone handset 40 so that the cover 10 can be easily slid over the handset 40. The opening 24 of the telephone handset cover 10 can be made with flared edges 26, as shown in FIG. 5, to facilitate sliding the cover onto a telephone handset. The handle section 12 of the cover 10 completely covers three sides of the handle 43 of the handset 40 to prevent contact between the user of the telephone and the handle 43. The earpiece 32 and the mouthpiece 28 of the cover 10 completely cover the earpiece 42 and mouthpiece 44 of the handset 40 to prevent the transferring of any germs thereon.

Figure 4:
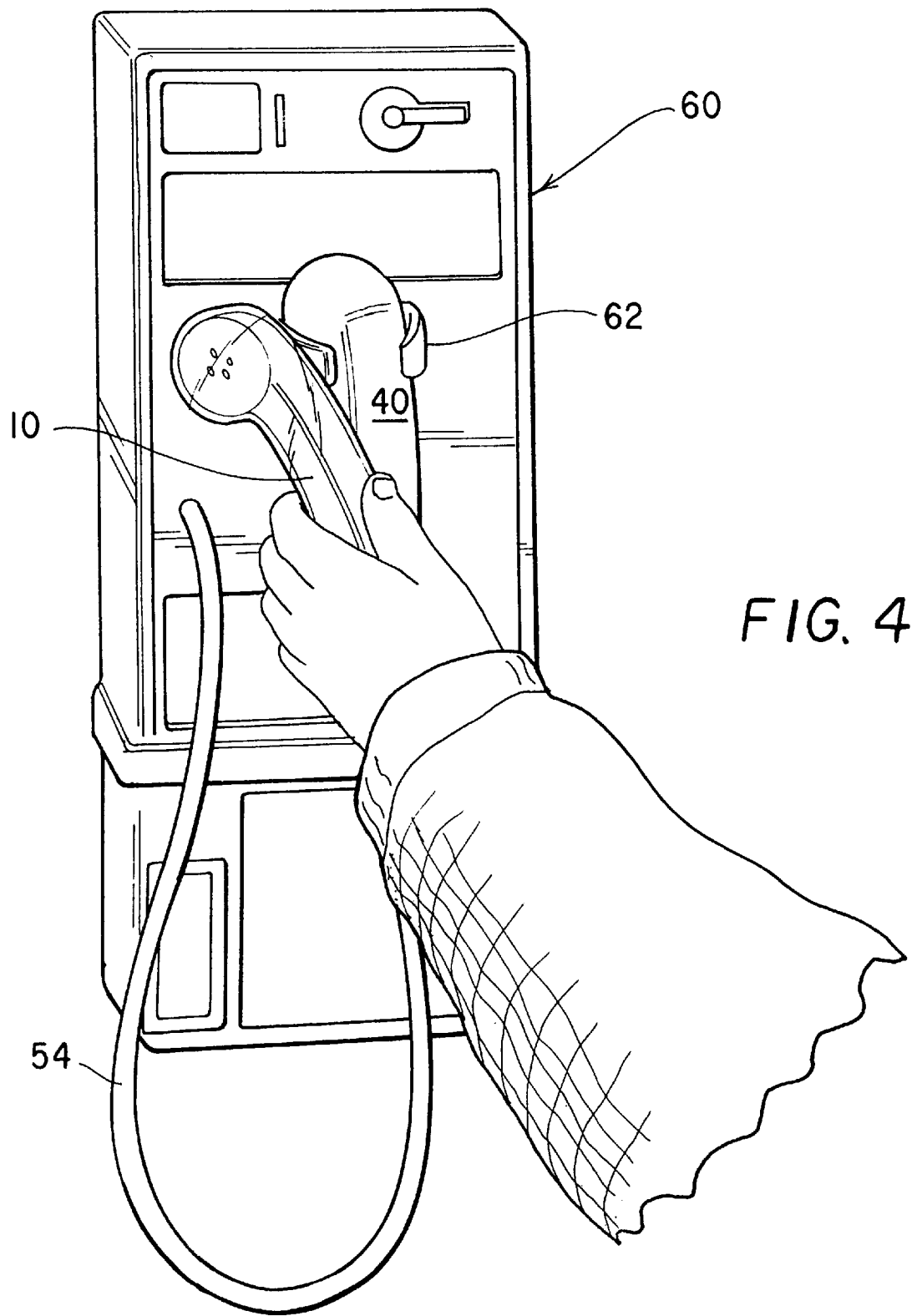
FIG. 4 is an environmental view of a telephone handset cover according to the present invention being used to pick up a telephone handset on a public telephone.

FIG. 4 illustrates an important benefit of the present invention. FIG. 4 shows how the cover 10 can be used to lift a telephone handset 40 from a public telephone 60 without touching the handset 40. First the mouthpiece section 14 of the cover 10 is slipped over the mouthpiece 44 of the handset 40. Second the individual grasps the cover 10 and uses the cover 10 to lift the handset 40 off of the hangup lever 62. Once the handset 40 is off the hangup lever 62, the individual can simply tilt the cover 10 and the handset 40 so that the covered lateral side 22 of the cover 10 is below the handset 40 and allow gravity to slip the handset 40 in position in the cover 10. Alternatively, the individual could push the handset 40 and cover 10 against a surface which will force the handset 40 to slip into position in the cover 10. Either method allows the individual to use the telephone without touching the handle 43 of the handset 40. The handset 40 can be hung up by simply tilting the cover 10 and handset 40 in the opposite direction and allowing the handset 40 to rotate about the mouthpiece section 14 of the cover 10 until the earpiece 42 of the handset 40 is sufficiently exposed to allow the handset 40 to be hung up.

The telephone handset cover 10 is made of flexible plastic material molded in the form of a telephone handset using conventional methods. The cover 10 as shown in FIGS. 1 through 4 is made of a clear plastic. The cover 10 can be washed to remove any germs that are transferred on to the inside of the cover 10. The cover 10 may be continuously reused by the individual, thereby eliminating the waste created by disposable telephone covers.

It is to be understood that the present invention is not limited to the sole embodiment described above, but encompasses any and all embodiments within the scope of the following claims.

I claim:

1. A cover for a telephone handset, the handset having a handle with a front side, a back side, and a pair of opposing lateral sides, the handle having a first end with a receiver connected thereto and a second end with a transmitter connected thereto, the receiver having an earpiece, and the transmitter having a mouthpiece, said handset having a cross sectional configuration defined by a plane parallel to said opposing lateral sides, said cover comprising:

a handle section having a first end and a second end, said handle section having walls dimensioned and configured to lie adjacent to the front side of the handset handle, the back side of the handset handle, and one lateral side of the handset handle;

a first end section connected to said first end of said handle section, said first end section dimensioned and configured to cover and lie adjacent to the earpiece of the handset, said first end section having apertures positioned to lie adjacent to the earpiece of the handset; and a second end section connected to said second end of said handle section, said second end section for covering and being adjacent to the mouthpiece of the handset, said second end section having apertures positioned to lie adjacent to the mouthpiece of the handset;

said handle section, first end section, and second end section defining a lateral opening having a configuration corresponding to the cross sectional configuration of said handset.

2. The cover according to claim 1 further comprising means for preventing interference between said cover and a cord for the telephone handset.

3. The cover according to claim 2 wherein said means for preventing interference between said cover and a cord for the telephone handset is located on said section end section.

4. The cover according to claim 1 wherein said cover is made of plastic material molded to fit around a telephone handset.

5. The cover according to claim 1 wherein said cover is dimensioned and configured to lie adjacent to a substantial portion of the telephone handset.

6. The cover according to claim 1 wherein said opening has flared edges.

7. The cover according to claim 1 wherein said cover is made of a transparent material.

8. The cover according to claim 1 wherein said cover is made of a flexible material.

9. A method of using the cover according to claim 1 comprising the steps of:

placing said second end section over the transmitter of the telephone handset;

lifting the telephone handset from the telephone; and rotating the telephone handset such that the receiver is within said first end section.

10. The method of using the cover according to claim 9 further comprising the steps of:

rotating the telephone handset such that the receiver is outside of said first end section;

hanging the telephone handset on the telephone; and removing said second end section from the transmitter of the telephone handset.

\* \* \* \* \*